US010656884B2

(12) United States Patent
Barrett

(10) Patent No.: US 10,656,884 B2
(45) Date of Patent: May 19, 2020

(54) SYSTEM AND METHOD FOR AUTOMATICALLY LOCKING IN RESPONSE TO A PRINT FAULT A PRINT JOB AND NOTIFICATION THEREOF

(71) Applicant: Xerox Corporation, Norwalk, CT (US)

(72) Inventor: Michael W. Barrett, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 7 days.

(21) Appl. No.: 16/045,800

(22) Filed: Jul. 26, 2018

(65) Prior Publication Data
US 2020/0034093 A1 Jan. 30, 2020

(51) Int. Cl.
*G06F 3/12* (2006.01)

(52) U.S. Cl.
CPC .......... *G06F 3/1222* (2013.01); *G06F 3/121* (2013.01); *G06F 3/1234* (2013.01); *G06F 3/1238* (2013.01); *G06F 3/1279* (2013.01); *G06F 3/1288* (2013.01)

(58) Field of Classification Search
None
See application file for complete search history.

(56) References Cited

U.S. PATENT DOCUMENTS

| 5,107,299 | A | 4/1992 | Farrell et al. |
| 5,128,772 | A | 7/1992 | Farrell et al. |
| 5,467,449 | A | 11/1995 | Gauronski et al. |
| 5,583,617 | A | 12/1996 | Altrieth, III et al. |
| 5,752,697 | A * | 5/1998 | Mandel ................ B65H 39/10 270/58.18 |
| 6,088,118 | A | 7/2000 | van Vliembergen et al. |
| 6,307,640 | B1 * | 10/2001 | Motegi ................ G06F 21/608 358/1.14 |
| 6,782,495 | B2 | 8/2004 | Bernklau-Halvor |
| 7,684,064 | B2 * | 3/2010 | Kimura ................ G06F 3/1222 358/1.14 |
| 7,773,241 | B2 * | 8/2010 | Akao ................... G06F 21/608 358/1.14 |
| 8,094,329 | B2 * | 1/2012 | Hirama ............... G06F 21/608 358/1.14 |
| 8,294,931 | B2 * | 10/2012 | Yamaguchi ........ H04N 1/00222 345/173 |

(Continued)

*Primary Examiner* — Paul F Payer
(74) *Attorney, Agent, or Firm* — Michael J. Nickerson; Basch & Nickerson LLP

(57) ABSTRACT

A method and system for preventing a printed sensitive or secured print job being left unsecured after a print recovery process by determining if a printer has encountered an interruption in a printing of a print job; determining, when it is determined that a printer has encountered an interruption in a printing of a print job, an identification of a user associated with the interrupted print job; obtaining an authentication code and sending the obtained authentication code to the user identified as being associated with the interrupted print job; recovering from the interruption in the printing of the print job; placing, after recovery, the interrupted print job on hold; determining if a proper authentication code has been received from the user identified as being associated with the interrupted print job; and releasing the held print job when it is determined that a proper authentication code has been received from the user identified as being associated with the interrupted print job.

7 Claims, 4 Drawing Sheets

(56) References Cited

U.S. PATENT DOCUMENTS

| | | | |
|---|---|---|---|
| 8,823,984 B2* | 9/2014 | Narita | G06F 3/1221 |
| | | | 358/1.15 |
| 8,913,273 B2 | 12/2014 | Oakley et al. | |
| 9,110,608 B2* | 8/2015 | Schultz | G06F 21/32 |
| 9,870,479 B2* | 1/2018 | Dalaa | G06F 21/608 |
| 2002/0116463 A1* | 8/2002 | Hart | H04L 51/12 |
| | | | 709/206 |

* cited by examiner

SYSTEM AND METHOD FOR AUTOMATICALLY LOCKING IN RESPONSE TO A PRINT FAULT A PRINT JOB AND NOTIFICATION THEREOF

BACKGROUND

Operations in an electronic reprographic system (printer) can, from time to time, be interrupted. Such an interruption can be the result of a printing fault, hardware or software faults, paper jams, a user created intentional interruption, etc.

Conventionally, an electronic reprographic system (printer) may perform various routines in response to an interruption or print fault.

For example, as disclosed in U.S. Pat. No. 5,107,299, a printer job recovery for use in an electronic reprographic system includes the detection of faults affecting printer operation. When such a fault is detected, fault recovery is carried out and operation continues.

U.S. Pat. No. 5,107,299 discloses that during fault recover, it is determined whether the print jobs are incomplete. If the print jobs are not incomplete, recovery is skipped and normal operation continues. However, if it is determined that there are incomplete jobs, it is determined whether there are any partially complete jobs. Upon determination that there are partially complete jobs, the system recovers the oldest partially complete job and the cycle continues until it is determined that there are no partially complete jobs. The entire content of U.S. Pat. No. 5,107,299 is hereby incorporated by reference.

In another example, as disclosed in U.S. Pat. No. 5,128,772, when handling copy sensitive jobs in an electronic reprographic printing system, a unique sheet routing operation can be utilized to ensure job integrity when printing copy sensitive jobs using multiset scheduling. A bin fill pattern is used which is unidirectional and begins at the same bin for each sheet of the set. The job recovery for copy sensitive jobs includes purging and remaking sets and partial sets to a greater extent for copy sensitive jobs than that required for non-copy sensitive jobs. The entire content of U.S. Pat. No. 5,128,772 is hereby incorporated by reference.

For example, as disclosed in U.S. Pat. No. 5,467,449, a fault clearance and recovery operation in an electronic reprographic system stores in memory clearance and recovery instructions for specific system faults, monitors the system for fault occurrence and displays the stored instructions upon detection of a fault occurrence. The entire content of U.S. Pat. No. 5,467,449 is hereby incorporated by reference.

In another example, as disclosed in U.S. Pat. No. 5,583,617, a reproduction apparatus has an operator control panel for providing operator interface for controlling the reproduction apparatus. The operator control panel includes a display for displaying a sequence of graphics at periodic intervals to assist an operator in clearing jams. The entire content of U.S. Pat. No. 5,583,617 is hereby incorporated by reference.

For example, as disclosed in U.S. Pat. No. 6,088,118, an image reproduction system includes an image generator for generating images for reproduction, memory in which a set of images can be stored, a printing system for printing images stored in the memory on support material. In response to a malfunction in the image generator, a control unit prints the images of complete sets stored in the memory at the time of the malfunction and prevents the printing of the images stored in the memory at the time of the malfunction if these images belong to incomplete sets stored in the memory which were being generated at the time of the image generator malfunction. The entire content of U.S. Pat. No. 6,088,118 is hereby incorporated by reference.

In another example, as disclosed in U.S. Pat. No. 6,782,495, a method diagnosis a printer problem includes correlating a wide range of printer data types with suggested solutions. Printer diagnostic data, which may include usage information and printer status information, is collected over a period of time and parsed into individual components. Rules are compared with each component, and the comparison is correlated with a set of solutions to determine the appropriate solution. The entire content of U.S. Pat. No. 6,782,495 is hereby incorporated by reference.

For example, as disclosed in U.S. Pat. No. 8,913,273, a printing apparatus includes processing elements, such as printing elements, a media path positioned to supply sheets of media to the printing elements, a media storage device maintaining the sheets of media and providing the sheets of media to the media path, a processor device operatively connected to the media storage device and the media path, and a graphic user interface operatively connected to the processor device. The processor device monitors operations of the media storage device and the media path to detect media path faults. The processor device evaluates the media path faults to determine the severity of the media path faults. The processor device performs the bypass operation based on a combination of at least one of the media path faults exceeding a previously established severity level and the user-selectable bypass option on the graphic user interface being selected. The entire content of U.S. Pat. No. 8,913,273 is hereby incorporated by reference.

The various conventional interruption or print fault recovery processes discussed above fail to provide an appropriate interruption or fault recovery process for situations involving the printing of sensitive or "secured" information.

For example, when a printer encounters a problem such that a print job, containing sensitive or "secured" information, has been released for marking (printing) but the process cannot commence or be completed due to a printer interruption or printer fault, a user may have approached the faulted printer and found that the printer is in a fault mode. Realizing that the printer is in a fault mode, the user may then walk away from the printer, with an understanding that the print job, containing sensitive or "secured" information, will not print.

However, conventional fault recovery procedures enable the printer to recover from the fault without regard for the possibly that the interrupted print jobs may contain sensitive or "secured" information, which should not be printed. If the user walks away thinking the print job will not print and the printer utilizes a conventional fault recovery process causing the print job, containing sensitive or "secured" information, to be printed, the result will be the printed job, containing sensitive or "secured" information, is left unsecured in an output tray or bin.

Therefore, it is desirable to provide a printer fault or interruption recovery system or process that prevents the printing a print job, containing sensitive or "secured" information, without the user having an awareness of or control of the post fault/interruption printing operation so as to prevent the printing of the print job, containing sensitive or "secured" information, being left unsecured in an output tray or bin.

BRIEF DESCRIPTION OF THE DRAWINGS

The drawings are only for purposes of illustrating various embodiments and are not to be construed as limiting, wherein.

DETAILED DESCRIPTION

Figure 1:
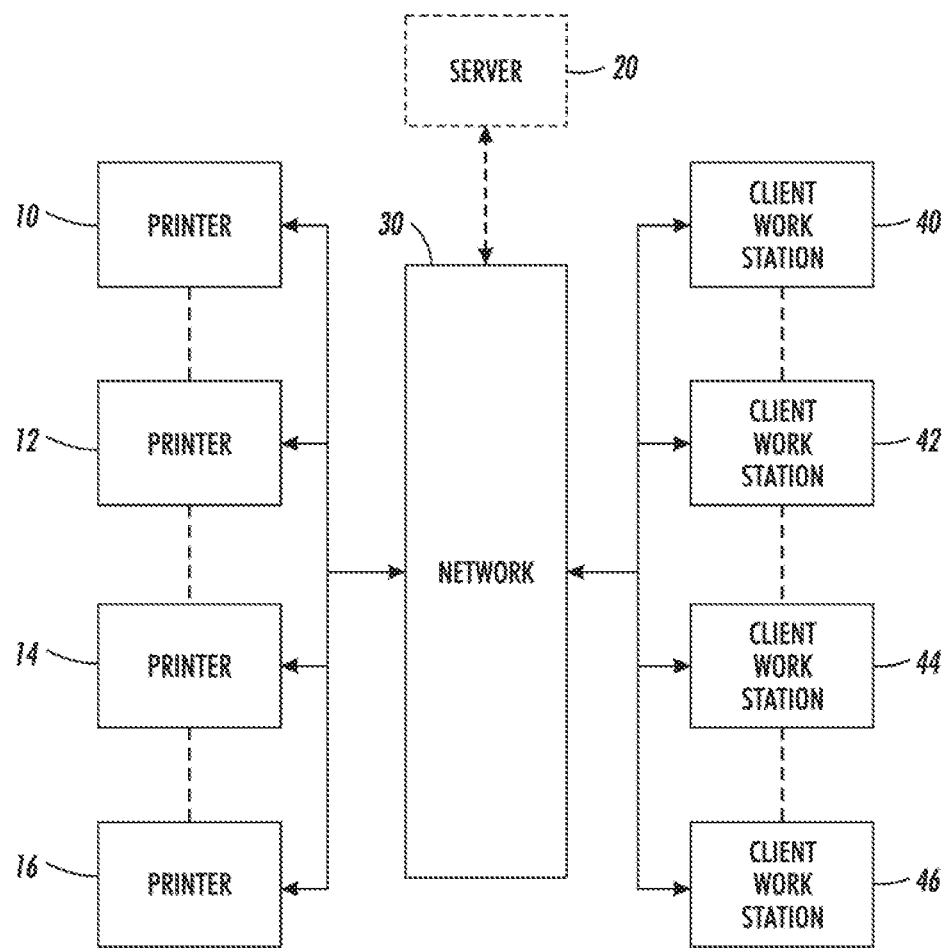
FIG. 1 shows an overview of a conventional network printing system.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts may be properly illustrated.

As illustrated in FIG. 1, a conventional network printing system includes a plurality of networked printers (10, 12, 14, and 16), a network 30, and a plurality of network client workstations (40, 42, 44, and 46). The network printing system may include an optional server 20 that provides print server functionality for the plurality of networked printers (10, 12, 14, and 16).

The network 30 may be a local area network including switches and routers. The network 30 may be hardwired, wireless, and/or combinations thereof. The network 30 may also be a wide area network.

The plurality of network client workstations (40, 42, 44, and 46) may be individual computers, laptops, mobile computing devices, personal digital computing devices, mobile telephonic devices, other electronic devices capable of providing printable data to the plurality of networked printers, and/or combinations thereof.

In a conventional system, one of the plurality of network client workstations (40, 42, 44, and 46) creates a print job (which includes the print data, print instructions, and other print attributes such as permissions or security rights) and transmits the print job to a selected networked printer (10, 12, 14, or 16) via the network 30.

Optionally, the print job may be initially transmitted, via the network 30, to the server 20, which manages the plurality of networked printers (10, 12, 14, and 16). The server 20 may process the print job and transmit the appropriate print data and print instructions to a selected networked printer (10, 12, 14, or 16) via the network 30.

Figure 2:
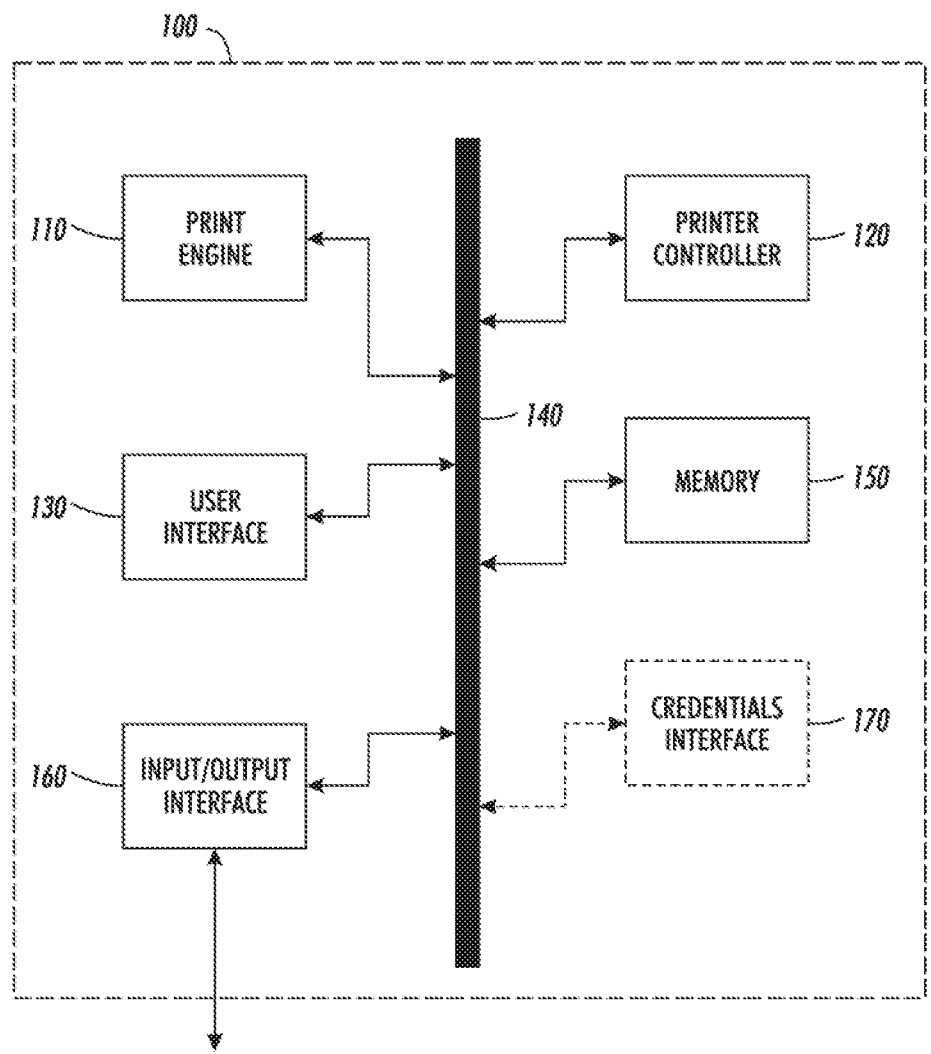
FIG. 2 shows a conventional networked printer.

As illustrated in FIG. 2, a conventional networked printer 100 includes a print engine 110, a print controller 120, a user interface 130, a communication bus 140, a memory 150, an input/output communication interface 160, and an optional credentials interface 170.

The print engine 110 converts the print data (electronic signals) to marks on a recording medium. The print engine 110 may utilize toner, inks, or other marking materials to produce the marks on the recording medium. The print engine 110 includes an output area (not shown) to dispense the marked recording material from the print engine 110.

The print engine 110 may also include various finishing modules or stations; such as a binding module, a stapling module, collating module, etc.; for executing finishing operations upon the marked recording material.

The print engine 110 includes a recording medium transport pathway (including rollers, nips, and/or belts, etc.) for physically moving the recording material into, throughout, and out from the print engine 110.

The print controller 120 is in communication with the print engine 110, the user interface 130, the memory 150, and the input/output communication interface 160, via the communication bus 140. The print controller 120, which includes an electronic processor, controls the various operations of the print engine 110, the user interface 130, the memory 150, the input/output communication interface 160, and the optional credentials interface 170.

The user interface 130 provides an interface for a user or operator to input instructions to the networked printer 100. The user interface 130 may be a touchscreen activatable display; a hardwired control panel with a non-activatable display; a display and keyboard; a display and a pointing device such as a mouse; a display, a keyboard, and a pointing device such as a mouse; or any combination thereof. It is noted that credential or authenticated information may be provided to the networked printer 100 via the user interface 130.

The memory 150 may store operational instructions for the networked printer 100, which the print controller 120 uses to control the various operations of the print engine 110, the user interface 130, the memory 150, the input/output communication interface 160, and the optional credentials interface 170. The memory 150 may also store a received print job and print data.

The input/output communication interface 160 provides a communication interface between the external network connected to the networked printer 100 and the various components of the networked printer 100. The input/output communication interface 160 between the external network connected to the networked printer 100 may be hardwired or wireless.

For example, in a networked printer environment, the print controller 120 may be in communication, via the input/output communication interface 160, with a print server, a directory server, or network server (as shown in FIG. 1).

The optional credentials interface 170 may be a card reader; a smart tag reader, such as a near field communication reader or a RFID reader; USB; or other device that allows the user to use a physical device to communicate credential information to the networked printer so that the network printer can authenticate the user with respect to a secured print job.

As discussed above, print server or network server may process the print job and transmit the appropriate print data and print instructions to the networked printer.

Moreover, the print server, directory server, or network server may provide, through the input/output communication interface 160, authentication services or security services for the printer.

For example, the print server, directory server, or network server may authenticate if a user has the proper credentials to use the printer and/or the proper credentials to print a secured or sensitive print job.

Furthermore, the print server, directory server, or network server may authenticate if the printer has the proper credentials to print a secured or sensitive print job.

The print server, directory server, or network server may include an electronic processor, memory, logic circuits, a user interface, and/or input/output communication interface.

As discussed above, a printer may encounter a problem (fault or interruption) such that a print job cannot commence or be completed.

Examples of such faults or interruptions may be the printer crashing while the print job is being processed; the printer's recording medium becoming jammed in the print engine; the printer's marking material being depleted; etc.

Such faults or interruptions may prevent the print job from commencing or being completed.

As discussed above, in conventional systems, when the fault or interruption is resolved, the printing process resumes completing the interrupted print job as well as the print jobs that may be in the print queue; i.e., print jobs to be rasterized or rasterized, but non-rendered (printed), print jobs.

More specifically, in the conventional recovery processes, the printing process resumes completing the interrupted print job even if the print job is a sensitive or secured print job and the user is not present to collect the print job. This causes the completed sensitive or secured print job to be unattended in the output tray, allowing any unauthorized person to collect because the user who submitted the sensitive or secured print job did not realize that the sensitive or secured print job was going to print immediately, without receiving a release instruction from the user, after resolving the print interruption or fault.

For example, when a user sends a sensitive or secured print job to a networked printer and then arrives at the networked printer only to find that the networked printer has crashed and is rebooting. The user walks away thinking that the sensitive or secured print job would not print, without receiving a release instruction from the user, after resolving the print interruption or fault. However, the sensitive or secured print job is printed and left unattended (unsecured) in the output tray later.

In an additional example, when a user sends a sensitive or secured print job to a networked printer and then arrives at the networked printer only to find that the networked printer has crashed. The user then tries to clear the fault or issue preventing the print job from completion and cannot resolve the issue without administrator intervention. The user walks away thinking that the sensitive or secured print job will not print, assuming that the print job will be deleted after administrator intervention. However, the sensitive or secured print job is printed after administrator intervention and left unattended (unsecured) in the output tray later.

Figure 3:
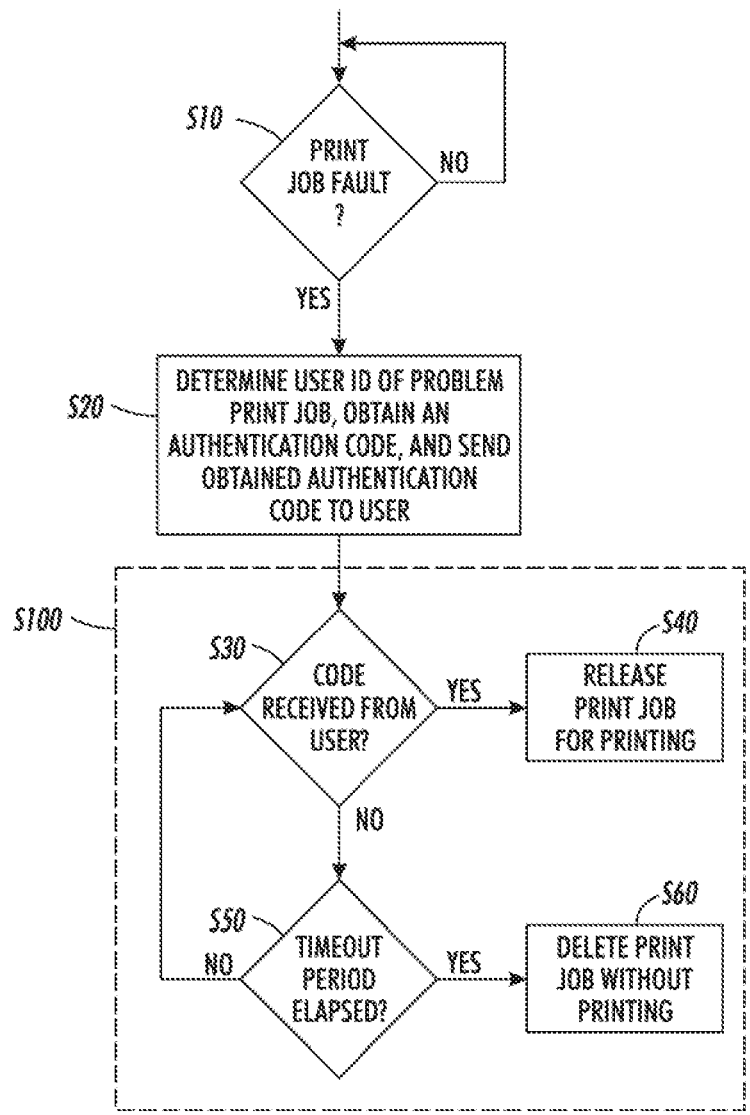
FIG. 3 is flowchart of an example of a printer fault or interruption recovery process.

To prevent a printed sensitive or secured print job being left unattended (unsecured) after a print interruption or fault recovery process, FIG. 3 illustrates a flowchart for putting the sensitive or secured print job on hold until the sensitive or secured print job is released by the authorized user.

As illustrated in FIG. 3, the operations of the networked printer are monitored to determine, at step S10, if the networked printer has encountered a fault or interruption. The monitoring can be carried out by the networked printer or by a print server or network server in communication with the networked printer.

If step S10 determines that the networked printer has encountered a fault or interruption, step S20 determines the user's identification associated with the problem print job, obtains or generates an authentication code, and sends obtained or generated authentication code to user.

The operations of step S20 can be carried out by the networked printer, by a print server or network server in communication with the networked printer, or a combination of both the networked printer and the print server or network server.

It is noted that step S20 can include a pre-operation to determine if the problem print job is a sensitive or secured print job that requires special handling. This pre-operation allows non-sensitive or non-secured print job to immediately print after the interruption or fault recovery without determining the user's identification associated with the problem print job, obtaining or generating an authentication code, and/or sending obtained or generated authentication code to user.

Step S20 places the problem print job on hold unless the pre-operation determination, noted above, is executed so that only a sensitive or secured print job is placed on hold.

If the problem print job is placed on hold, the process moves to the release process of step S100.

The release process of step S100 includes step S30, step S40, step S50, and step S60.

If the problem print job is placed on hold, step S30 determines if the proper authentication code is received from the user.

If step S30 determines that the proper authentication code has been received from the user, step S40 releases the problem print job so that it can be printed by the networked printer.

If step S30 determines that the proper authentication code has not been received from the user, step S50 determines if a timeout period has elapsed. In other words, step S50 determines if proper authentication code has not been received from the user within a predetermined amount of time.

If step S50 determines that a timeout period has elapsed, step S60 deletes the problem print job, thereby preventing the print job from being printed and left unattended.

Figure 4:
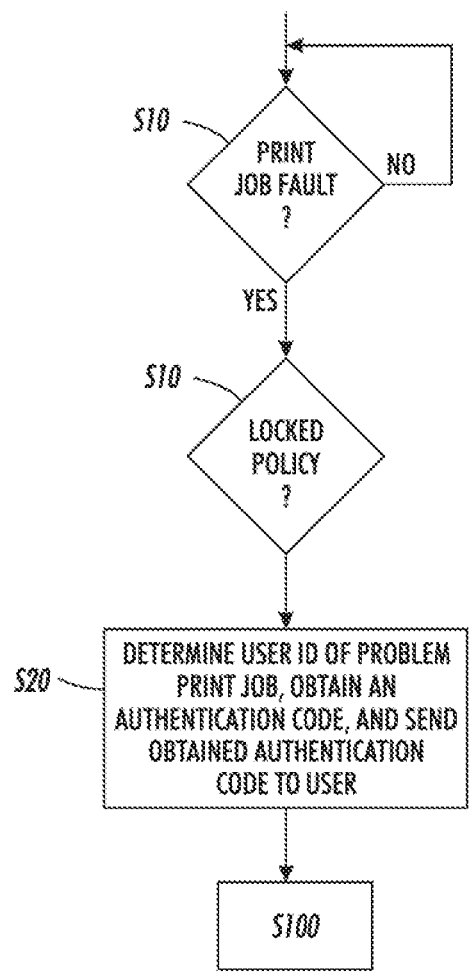
FIG. 4 is flowchart of another example of a printer fault or interruption recovery process.

FIG. 4 illustrates another embodiment for putting the sensitive or secured print job on hold until the sensitive or secured print job is released by the authorized user.

As illustrated in FIG. 4, the operations of the networked printer are monitored to determine, at step S10, if the networked printer has encountered a fault or interruption. The monitoring can be carried out by the networked printer or by a print server or network server in communication with the networked printer.

If step S10 determines that the networked printer has encountered a fault or interruption, step S15 determines if there is a locked policy with respect to the networked printer or a locked policy with respect to the print job associated with the fault or interruption.

A locked policy is a policy indicating that the print operation is associated with sensitive or secured data, and thus, the printed document should not be created or release until proper authentication and/or credentials have been received.

Such authentication and/or credentials could be in the form of a password, private identification number (PIN), a digital certificate, biometrics, and/or a security card having the authentication and/or credentials associated therewith.

The operations of step S15 can be carried out by the networked printer, by a print server or network server in communication with the networked printer, or a combination of both the networked printer and the print server or network server.

If step S15 determines that there is a locked policy with respect to the networked printer or a locked policy with respect to the print job associated with the fault or interruption, step S20 determines the user's identification associated with the problem print job, obtains or generates an authentication code, and sends obtained or generated authentication code to user.

The operations of step S20 can be carried out by the networked printer, by a print server or network server in communication with the networked printer, or a combination of both the networked printer and the print server or network server.

Step S20 places the problem print job on hold unless the pre-operation determination, noted above, is executed so that only a sensitive or secured print job is placed on hold.

If the problem print job is placed on hold, the process moves to the release process of step S100, as described in more detail above with respect to FIG. 3.

With respect to the embodiment described above, an example of a release process may occur when the machine realizes that it cannot complete a job due to a fault or interruption.

If the print job and/or printer are the subject of a security policy, the networked printer, a print server or network server in communication with the networked printer, or a combination of both the networked printer and the print server or network server, based on the security policy, may determine a user via a user ID associated with the print job. The networked printer, a print server or network server in communication with the networked printer, or a combination of both the networked printer and the print server or network server then looks up the user in a directory server or internal database of the networked printer, a print server or network server in communication with the networked printer, or a combination of both the networked printer and the print server or network server.

When the user is found, the networked printer, a print server or network server in communication with the networked printer, or a combination of both the networked printer and the print server or network server locks the print job.

To enable the unlocking of the print job, in one embodiment, the networked printer, a print server or network server in communication with the networked printer, or a combination of both the networked printer and the print server or network server creates a randomized authentication code, such as a randomized PIN or randomized password. The user is then sent electronic commination, such as an email or text, based on the email address or mobile number found in the directory server or local database, notified of the situation, and provided with the created random authentication code. If the user does not release the print job with the created random authentication code within a timeout period, defined by an administrator, the print job is deleted.

It is noted that the process may contain an additional time window that enables the sending of a second or additional electronic communications prior to the actual deletion of the print job. These additional electronic communications could be in the form of warnings or alerts (could include the authentication code) of a pending deletion operation and could include information as to when the deletion will occur.

In another example, if the print job was a secure print job requiring login at the networked printer to release the secure print job, the networked printer just relocks the print job, after recovering from the fault or interruption, using the method that made the original print job secure; i.e., requiring the user to re-login after the networked printer has recovered from the fault or interruption to release the secure print job.

In a further embodiment, if the print job was a secure print job requiring the user to scan in a security card (badge) or other physical security device that communicates credential information to the networked printer to release the secure print job, the networked printer just relocks the print job, after recovering from the fault or interruption, using the method that made the original print job secure; i.e., requiring the user to re-engage the networked printer with a security card (badge) or other physical security device that communicates credential information to the networked printer after the networked printer has recovered from the fault or interruption to release the secure print job.

In another embodiment, the networked printer or a print server or network server in communication with the networked printer may have a stored user profile associated with the networked printer, wherein the user profile has stored therein an authentication code associated with the user. This allows the user to release the locked print job when the user is at the networked printer without the generation of an electronic commination, such as an email or text, containing a randomized generated authentication code.

In a further embodiment, the email generated for the releasing of the locked job may be hyperlinked to the network printer so that the email may include linked voting buttons that enables the user to select an option for the locked print job.

For example, linked voting buttons may allow the user to immediately delete the locked print job, put the locked print job on hold for a specific period of time or indefinitely (thereby preventing the locked print job from being deleted by the networked printer), release the locked print job immediately, or release the locked print job after a specific period of time or at a specific time.

Additionally, the email may contain linked voting buttons which allows the user to move the locked print job to another networked printer to be printed on the selected networked printer.

In summary, a method for preventing a printed sensitive or secured print job being left unsecured after a print recovery process, comprises (a) determining if a printer has encountered an interruption in a printing of a print job; (b) determining, when it is determined that a printer has encountered an interruption in a printing of a print job, an identification of a user associated with the interrupted print job; (c) obtaining an authentication code and sending the obtained authentication code to the user identified as being associated with the interrupted print job; (d) recovering from the interruption in the printing of the print job; (e) placing, after recovery, the interrupted print job on hold; (f) determining if a proper authentication code has been received from the user identified as being associated with the interrupted print job; and (g) releasing the held print job when it is determined that a proper authentication code has been received from the user identified as being associated with the interrupted print job.

The method may determine if the proper authentication code has not been received from the user identified as being associated with the interrupted print job within a predetermined amount of time and delete the held print job if it is determined that the proper authentication code has not been received from the user identified as being associated with the interrupted print job within the predetermined amount of time.

It may be determined if the interrupted print job is associated with a locked policy such that it is determined, when it is determined that the interrupted print job is associated with a locked policy, an identification of a user associated with the interrupted print job.

The authentication code may be randomly created, and wherein the randomly created authentication code is emailed to the user associated with the interrupted print job.

The authentication code may be embedded in hyperlinked voting buttons of an email sent to the user associated with the interrupted print job.

A method for preventing a printed sensitive or secured print job being left unsecured after a print recovery process, comprises (a) determining if a printer has encountered an interruption in a printing of a print job; (b) determining, when it is determined that a printer has encountered an interruption in a printing of a print job, an identification of a user associated with the interrupted print job; (c) recovering from the interruption in the printing of the print job; (d) placing, after recovery, the interrupted print job on hold; (e) determining if a proper authentication code has been received from the user identified as being associated with the interrupted print job; and (f) releasing the held print job when it is determined that a proper authentication code has been received from the user identified as being associated with the interrupted print job.

The method may determine if the proper authentication code has not been received from the user identified as being associated with the interrupted print job within a predetermined amount of time and delete the held print job if it is determined that the proper authentication code has not been received from the user identified as being associated with the interrupted print job within the predetermined amount of time.

The method may send an electronic communication, after recovering from the interruption in the printing of the print job, to the user associated with the interrupted print job, the electronic communication including the proper authentication code; determine if the proper authentication code has not been received from the user identified as being associated with the interrupted print job within a first predetermined amount of time; send a second electronic communication, when it is determined that the proper authentication code has not been received from the user identified as being associated with the interrupted print job within the first predetermined amount of time, to the user associated with the interrupted print job, the second electronic communication including the proper authentication code; determine if the proper authentication code has not been received from the user identified as being associated with the interrupted print job within a second predetermined amount of time; and delete the held print job if it is determined that the proper authentication code has not been received from the user identified as being associated with the interrupted print job within the second predetermined amount of time.

The method may determine if the interrupted print job is associated with a locked policy such that it is determined, when it is determined that the interrupted print job is associated with a locked policy, an identification of a user associated with the interrupted print job.

The authentication code may be associated with a pre-stored user profile.

The authentication code may be embedded in hyperlinked voting buttons of an email sent to the user associated with the interrupted print job.

The authentication code may be embedded in a security card. The authentication code may be embedded in a smart tag device.

A system for preventing a printed sensitive or secured print job being left unsecured after a print recovery process, comprises a printer including a print engine, a print controller, a memory, and a user interface; the printer controller determining if the printer has encountered an interruption in a printing of a print job; the printer controller determining, when it is determined that a printer has encountered an interruption in a printing of a print job, an identification of a user associated with the interrupted print job; the printer controller causing the printer to recover from the interruption in the printing of the print job; the printer controller placing, after recovery, the interrupted print job on hold; the printer controller determining if a proper authentication code has been received from the user identified as being associated with the interrupted print job; the printer controller releasing the held print job when it is determined that a proper authentication code has been received from the user identified as being associated with the interrupted print job.

The printer controller may determine if the proper authentication code has not been received from the user identified as being associated with the interrupted print job within a predetermined amount of time and delete the held print job if it is determined that the proper authentication code has not been received from the user identified as being associated with the interrupted print job within a predetermined amount of time.

The printer controller may determine if the interrupted print job is associated with a locked policy such that the printer controller determines, when it is determined that the interrupted print job is associated with a locked policy, an identification of a user associated with the interrupted print job.

The authentication code may be an associated with a pre-stored user profile stored in the memory. The authentication code may be embedded in hyperlinked voting buttons of an email sent to the user associated with the interrupted print job.

The system may further comprise a credential reader; the authentication code being embedded in a credential communication device that is readable by the credential reader.

The system may further comprise a credential reader; the authentication code being embedded in embedded in a smart tag device that is readable by the credential reader.

It will be appreciated that several of the above-disclosed embodiments and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the description above and the following claims.

What is claimed is:

1. A method for preventing a printed sensitive or secured print job being left unsecured after a print recovery process, comprising:
    (a) determining if a printer has encountered an interruption in a printing of a print job;
    (b) determining, when it is determined that a printer has encountered an interruption in a printing of a print job, an identification of a user associated with the interrupted print job;
    (c) obtaining an authentication code and sending, via an email, the obtained authentication code to the user identified as being associated with the interrupted print job, the authentication code being embedded in hyperlinked voting buttons in the email sent to the user associated with the interrupted print job;
    (d) recovering from the interruption in the printing of the print job;
    (e) placing, after recovery, the interrupted print job on hold;
    (f) determining if a proper authentication code has been received from the user identified as being associated with the interrupted print job;
    (g) releasing the held print job when it is determined that a proper authentication code has been received from the user identified as being associated with the interrupted print job;

(h) determining if the proper authentication code has not been received from the user identified as being associated with the interrupted print job within a predetermined amount of time; and (i) deleting the held print job if it is determined that the proper authentication code has not been received from the user identified as being associated with the interrupted print job within the predetermined amount of time.

2. The method as claimed in claim 1, wherein the authentication code is randomly created, and wherein the randomly created authentication code is emailed to the user associated with the interrupted print job.

3. A method for preventing a printed sensitive or secured print job being left unsecured after a print recovery process, comprising:

(a) determining if a printer has encountered an interruption in a printing of a print job;

(b) determining, when it is determined that a printer has encountered an interruption in a printing of a print job, an identification of a user associated with the interrupted print job;

(c) sending, via an email, an authentication code to the user identified as being associated with the interrupted print job, the authentication code being embedded in hyperlinked voting buttons in the email sent to the user associated with the interrupted print job;

(d) recovering from the interruption in the printing of the print job;

(e) placing, after recovery, the interrupted print job on hold;

(f) determining if a proper authentication code has been received from the user identified as being associated with the interrupted print job;

(g) releasing the held print job when it is determined that a proper authentication code has been received from the user identified as being associated with the interrupted print job;

(h) determining if the proper authentication code has not been received from the user identified as being associated with the interrupted print job within a predetermined amount of time; and (i) deleting the held print job if it is determined that the proper authentication code has not been received from the user identified as being associated with the interrupted print job within the predetermined amount of time.

4. The method as claimed in claim 3, wherein the authentication code is associated with a pre-stored user profile.

5. The method as claimed in claim 3, wherein said determining if the proper authentication code has not been received from the user identified as being associated with the interrupted print job within a predetermined amount of time including, (h1) determining if the proper authentication code has not been received from the user identified as being associated with the interrupted print job within a first predetermined amount of time, (h2) sending a second electronic communication, when it is determined that the proper authentication code has not been received from the user identified as being associated with the interrupted print job within the first predetermined amount of time, to the user associated with the interrupted print job, the second electronic communication including the proper authentication code, and (h3) determining if the proper authentication code has not been received from the user identified as being associated with the interrupted print job within a second predetermined amount of time;

said deleting the held print job if it is determined that the proper authentication code has not been received from the user identified as being associated with the interrupted print job within the predetermined amount of time including deleting the held print job if it is determined that the proper authentication code has not been received from the user identified as being associated with the interrupted print job within the second predetermined amount of time.

6. A system for preventing a printed sensitive or secured print job being left unsecured after a print recovery process, comprising:

a printer including a print engine, a print controller, a memory, and a user interface;

said printer controller determining if said printer has encountered an interruption in a printing of a print job;

said printer controller determining, when it is determined that a printer has encountered an interruption in a printing of a print job, an identification of a user associated with the interrupted print job;

said printer controller sending, via an email, an authentication code to the user identified as being associated with the interrupted print job, the authentication code being embedded in hyperlinked voting buttons in the email sent to the user associated with the interrupted print job;

said printer controller causing said printer to recover from the interruption in the printing of the print job;

said printer controller placing, after recovery, the interrupted print job on hold;

said printer controller determining if a proper authentication code has been received from the user identified as being associated with the interrupted print job;

said printer controller releasing the held print job when it is determined that a proper authentication code has been received from the user identified as being associated with the interrupted print job;

said printer controller determining if the proper authentication code has not been received from the user identified as being associated with the interrupted print job within a predetermined amount of time;

said printer controller deleting the held print job if it is determined that the proper authentication code has not been received from the user identified as being associated with the interrupted print job within a predetermined amount of time.

7. The system as claimed in claim 6, wherein said authentication code is associated with a pre-stored user profile stored in said memory.

\* \* \* \* \*